May 14, 1968  J. K. BEVERLEY  3,382,599
FISHING LURE RETRIEVER
Filed Sept. 13, 1965

INVENTOR
JOHN K. BEVERLEY
BY
*Gravely, Lieder & Woodruff*

ATTORNEYS

United States Patent Office 3,382,599
Patented May 14, 1968

3,382,599
FISHING LURE RETRIEVER
John K. Beverley, 4 Ladue Ridge Road,
St. Louis County, Mo. 63124
Filed Sept. 13, 1965, Ser. No. 486,785
6 Claims. (Cl. 43—17.2)

ABSTRACT OF THE DISCLOSURE

A fishing lure retriever having a primary impact member of hollow form and a secondary impact member loosely caged in the primary member, and slot means in the body of the primary member to receive the line connected to the snagged fishing lure so that the snagged line acts as a guide to direct the retriever against the snagged fishing lure.

---

This invention relates to a fishing lure retriever, and more particularly to a fishing lure retriever with secondary impact means.

One of the problems in fishing is the frequent loss of fishing lures due to hooks thereon snagging on trees and branch sections beneath the water surface. Most fishing lines are not strong enough to withstand the tension in attempts to free snagged hooks by pulling on the fishing line. Often attempts to free the fishing lure hooks by pulling on the fishing line causes the hooks to become further secured or embedded in the snagging obstruction.

The present invention alleviates the problem of entangled fishing lures by providing a fishing lure retriever which has novel features which facilitate recovery of snagged fishing lures.

Therefore, it is an important object of the invention to provide a fishing lure retriever that may be applied to fish lines without cutting the line, uses the line to guide the lure retriever to the snagged lure, and by raising and lowering will apply an initial and secondary impact to the lure for purposes of freeing the same from entanglement.

It is another object of the invention to provide a fishing lure retriever which may be positioned on the fishing line and lowered down the fishing line by a separate, much stronger line to engage the snagged fishing lure and jar it loose from the obstruction.

It is a further object of the invention to provide a fishing lure retriever which is simple and convenient to use, and easily placed in a working position over a fishing line.

These and other objects and advantages of the invention will become readily apparent from the ensuing description taken in conjunction with the appended claims and the drawing, wherein;

Figure 1:
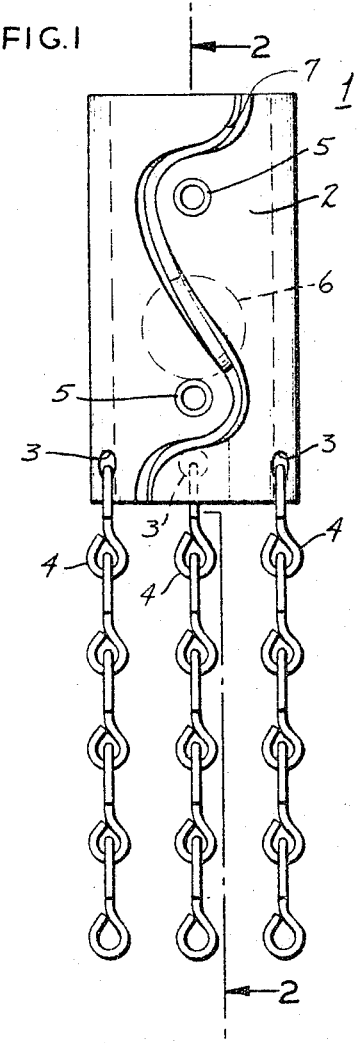
FIG. 1 is a side elevational view of the fishing lure retriever.
Figure 2:
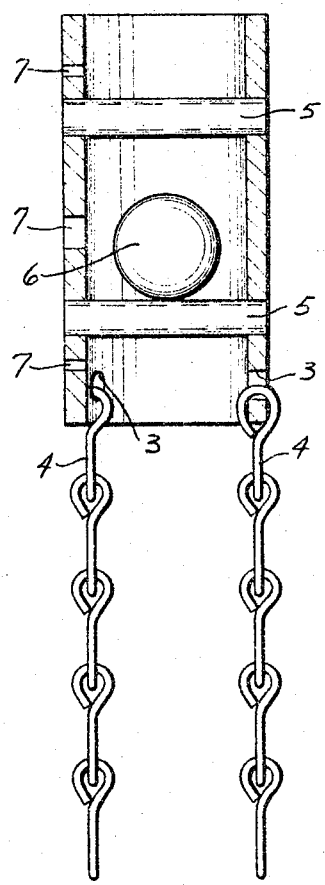
FIG. 2 is a sectional view taken along the line 2—2 in FIG. 1.

Referring to the drawing, the fishing lure retriever 1 is formed of a tubular body 2, which is preferably made or formed from a suitable material such as metal to provide a sinkable weight. One end of the tubular body 2 has a series of apertures 3. Each aperture 3 supports a short length of chain 4 which is free to oscillate or to hang pendant from the fishing lure retriever 1.

A pair of tubular pins 5 extend diametrically transverse to the tubular body 1. The tubular pins 5 are aligned in the same diametrical plane through the tubular body 2. A weighted member 6, such as a ball, is caged between the pins 5. The weighted member 6 is of such dimensions as to permit both longitudinal and transverse movement between the caging pins 5. The tubular body 1 has an S-shaped or reverse-curved slot 7 extending throughout the longitudinal length of the body 2. The reverse-curved slot 7 intersects the diametrical plane of pins 5 both above and below each of the pins and intermediate the pins. The construction of the reverse-curved slot 7 facilitates positioning the fishing lure retriever over a fishing line which has a snagged fishing lure on the end thereof such that the fishing line extends longitudinally through the fishing lure retriever 1 passing on opposite sides of the caging pins to prevent the fishing lure retriever 1 from slipping off the fishing line attached to the snagged lure.

In practice, when the fishing lure retriever is to be used to free a snagged lure on the end of a fishing line, the fishing lure retriever 1 is positioned around the fishing line with the chain links 4 at the lowermost end of the fishing lure retriever 1 by slackening the fishing line and passing it through the reverse-curved slot 7. Of course, a line much stronger than the fishing line is previously secured to the uppermost tubular pin to facilitate manipulating the lure retriever when lowered along the fish line to the area of the snagged fish lure. The fishing lure retriever 1 is worked by jiggling its lead line to cause several impacts of the tubular body with the snagged lure. After each impact of the tubular body, the weighted member 6 will apply a secondary impact through the tubular body to the snagged fishing lure. Under the impact, the chains 4 may aid in freeing the lure by engaging some of the fishing lure hook elements which may or may not be snagged. Moreover, the chains 4 assist in preventing the fishing lure from becoming further entangled once it has been freed by the operation of the fishing lure retriever.

Of course it will be appreciated that the fishing lure retriever 1 is effective to provide an initial and secondary impact against the snagged fishing lure as well as depending chains to engage hooks or barbs on the snagged lure. Further, the much stronger line, which may be wire or cord, used to lower the fishing lure retriever 1 along the fishing line attached to the snagged lure will permit a greater pull on the entangled fishing lure to facilitate freeing the same if the chains have engaged the hook or barbs on the snagged fishing lure.

The foregoing illustrates and describes a preferred embodiment of the invention, however, various modifications and changes will be readily appreciated by those skilled in the art, and such modifications and changes are contemplated. Hence the invention is limited only by the scope of the appended claims.

What is claimed is:

1. A fishing lure retriever comprising a tubular body constituting an impact member, a pair of spaced caging pins secured to said tubular body and extending diametrically transverse of the tubular body, and a secondary impact member positioned between said caging pins, said tubular body defining a reverse-curved slot to facilitate retention of the fishing lure retriever about a fishing line having a snagged fishing lure attached.

2. A fishing lure retriever comprising a tubular body constituting an impact member, a pair of spaced caging members extending diametrically transverse of the tubular body and rigidly secured thereto, said tubular body defining a slot extending throughout the length of said tubular body and between the axes of said caging members for admitting a slackened fishing line and retaining said fishing line when taut, and a secondary impact member retained between said caging members.

3. The fishing lure retriever of claim 1 having several chains attached and depending from said tubular body to aid in retrieving a snagged fishing lure.

4. The fishing lure retriever of claim 1 wherein said secondary impact member is a weighted ball.

5. The fishing lure retriever of claim 2 wherein the slot defined by said tubular body is in the form of an S-shape.

6. A fishing lure retriever comprising a tubular body, a pair of spaced pins secured diametrically transverse to said body, a weighted ball caged between said spaced pins, at least one chain depending from one end of said tubular body, and an S-shaped slot defined by said tubular body and extending intermediate the axes of said spaced pins for admitting a fishing line.

References Cited

UNITED STATES PATENTS

| | | | |
|---|---|---|---|
| 2,482,037 | 9/1949 | Swaim | 43—17.2 |
| 2,627,691 | 2/1953 | Bress | 43—17.2 |
| 2,761,235 | 9/1956 | Payne | 43—17.2 |
| 3,012,355 | 12/1961 | Cottrell | 43—17.2 |

SAMUEL KOREN, *Primary Examiner.*

J. H. CZERWONKY, *Assistant Examiner.*